(12) United States Patent
Hedler

(10) Patent No.: US 9,151,037 B2
(45) Date of Patent: Oct. 6, 2015

(54) PANELIZED STRUCTURE IMPROVEMENT

(71) Applicant: Martin P. Hedler, Toledo, OH (US)

(72) Inventor: Martin P. Hedler, Toledo, OH (US)

(*) Notice: Subject to any disclaimer, the term of this patent is extended or adjusted under 35 U.S.C. 154(b) by 0 days.

(21) Appl. No.: 14/084,915

(22) Filed: Nov. 20, 2013

(65) Prior Publication Data

US 2014/0137504 A1 May 22, 2014

Related U.S. Application Data

(60) Provisional application No. 61/728,614, filed on Nov. 20, 2012.

(51) Int. Cl.
*E04B 1/343* (2006.01)
*E04B 1/32* (2006.01)
*F16B 5/00* (2006.01)
*E04B 2/74* (2006.01)

(52) U.S. Cl.
CPC ............ *E04B 1/34321* (2013.01); *E04B 1/3211* (2013.01); *E04B 2001/3276* (2013.01); *E04B 2002/7488* (2013.01); *F16B 5/0004* (2013.01)

(58) Field of Classification Search
CPC .................. E04B 2001/327; E04B 2001/3276; E04B 2001/3282; E04B 2001/3288; E04B 2002/7461; E04B 1/34321; E04B 2002/7462; E04B 2002/7464; E04B 1/3211
USPC ........ 52/81.2, 81.4, 81.5, 282.1, 282.2, 582.1
See application file for complete search history.

(56) References Cited

U.S. PATENT DOCUMENTS

| | | | | |
|---|---|---|---|---|
| 2,388,297 A * | 11/1945 | Slaughter | .......................... | 428/53 |
| 3,738,083 A * | 6/1973 | Shimano | ...................... | 52/584.1 |
| 3,953,949 A * | 5/1976 | O'Sheeran | ........................ | 52/82 |
| 4,425,740 A * | 1/1984 | Golden | ........................ | 52/81.1 |
| 4,615,155 A * | 10/1986 | Chamberlain | ................. | 52/91.1 |
| 4,621,467 A * | 11/1986 | Golden | ........................ | 52/81.1 |
| 4,840,440 A * | 6/1989 | Dieter | ........................ | 312/140 |
| 4,866,890 A * | 9/1989 | Otto | ................................ | 52/12 |
| 5,706,620 A * | 1/1998 | De Zen | ........................ | 52/220.2 |
| 5,706,624 A | 1/1998 | Lipson | | |
| 6,119,417 A | 9/2000 | Valverde et al. | | |
| 6,173,547 B1 * | 1/2001 | Lipson | ........................ | 52/582.1 |
| 6,250,021 B1 | 6/2001 | Ferrara, Jr. | | |
| 8,429,858 B1 | 4/2013 | Robinson et al. | | |
| 2004/0238021 A1 | 12/2004 | Holub et al. | | |
| 2007/0163185 A1 | 7/2007 | Morley et al. | | |
| 2007/0266643 A1 | 11/2007 | Cowvins | | |
| 2008/0066393 A1 | 3/2008 | Sorensen | | |

FOREIGN PATENT DOCUMENTS

WO    WO 2010015042    2/2010

* cited by examiner

*Primary Examiner* — Brian Glessner
*Assistant Examiner* — Adam Barlow
(74) *Attorney, Agent, or Firm* — Vincent Re PLLC

(57) ABSTRACT

A panelized complex polyhedron structure can be constructed quickly and inexpensively from a plurality of panels. The structure includes the plurality of panels and connecting features permitting an upper panel of the plurality of panels to overhang an adjacent lower panel of the plurality of panels. The upper panel overhangs to the adjacent lower panel.

20 Claims, 15 Drawing Sheets

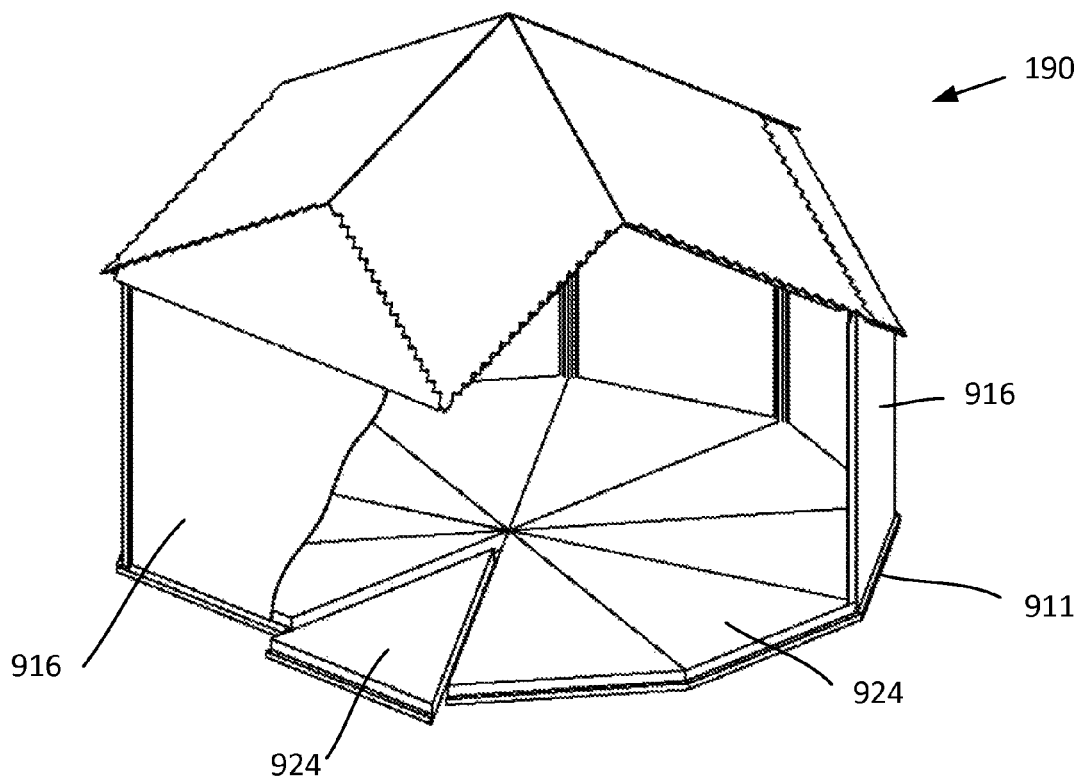
FIG. 19A
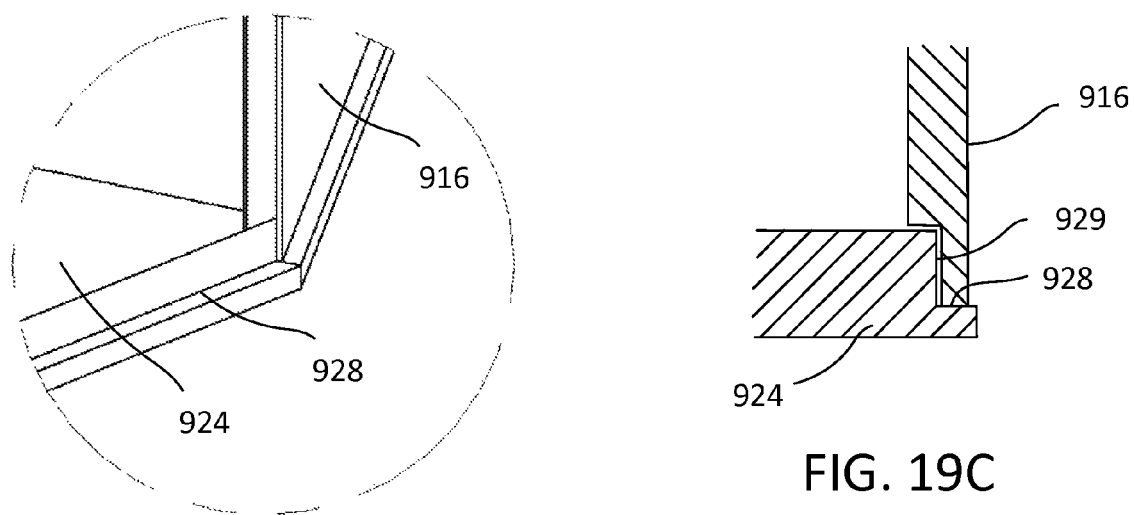
FIG. 19B
FIG. 19C

PANELIZED STRUCTURE IMPROVEMENT

CROSS-REFERENCE TO RELATED APPLICATIONS

This disclosure claims the benefit of U.S. Provisional Application No. 61/728,614 filed on Nov. 20, 2012 which is hereby incorporated by reference.

TECHNICAL FIELD

This disclosure is related to a panelized structure useful for rapid deployment. In particular, the disclosure related to panelized structures with improved construction preventing water infiltration through joints between the panels.

BACKGROUND

The statements in this section merely provide background information related to the present disclosure. Accordingly, such statements are not intended to constitute an admission of prior art.

Conditions are known wherein rapid deployment of temporary structures is desired. Natural disasters can destroy homes and residences. Refugees can rapidly become a concern under conditions of natural disaster or warfare.

Commercial situations can additionally benefit from rapid deployment of temporary structures. Sporting events can draw large crowds to a venue, where vendors, tailgaters, first aid stations, police, and other interests can require a structure in which to operate for a brief time associated with the event. Colleges can benefit from temporary structures around campus during new student orientations or other large events. Conventions or tradeshows can benefit from use of temporary structures. Designs used for temporary structures can be made of durable material, such as sheet metal, for use as outbuildings or utility structures for storage or other purposes.

Temporary structures can include a number of embodiments. One embodiment of a temporary structure includes a panelized structure. Panelized structures utilize a plurality of rigid panels that are joined to form a three-dimensional shape. Such a temporary structure can be shaped as a cube, but cubes lack structural strength and can be vulnerable to high winds or other stresses. Failure of a single joint can cause the structure to structurally fail. More complex geometric shapes can be used with increased structural strength. Complex polyhedrons include shapes that only fit together in a single configuration. Rigidity of the multiple panels and the inter-relation of the shapes increase the structural strength of the temporary structure. Any three dimensional structure can be described as a geometric structure, but for the purposes of the disclosure, a geometric structure will be defined as a complex polyhedron having more sides than a cube. One particular exemplary structure is described as a rhombic tricontrahedral enclosure.

Rhombic triacontahedral structures are known in the art, wherein the structures enclose space by incorporating panels fastened at precise angles through the use of a plurality of connectors at panel edges. An exemplary rhombic tricontrahedral enclosure includes a number of flat panels, with defined geometric properties including set angles between various geometric surfaces. Angles for many of the geometric surfaces are set at 144 degrees. Wherein a face to the object is defined such that a door can be placed upon the face of the object, such as is used for a rhombic tricontrahedral structure, an angle of 126 degrees between the face and adjoining panels can be used to create a flat front to the face or an angle of 108 degrees can be used to form a face wherein sides of the face angle inwards.

In one embodiment of those structures, connectors with a singledihedral angle of 144 degrees between all panels forms a hemispheric enclosure in the shape of a partial rhombic triacontahedron. Other embodiments connect a portion of the said panels at 108 degrees and 126 degrees to create enclosures with alternative features. Known connectors feature channels at either side of the connector, each channel accepting a panel with a width fitted to the width of the channels. Panels connected by a connector with channel connections are connected only at panel edges. All panels fit into channels upon connectors such that al panel edges are substantially contained within connector channels. Such a configuration requires all panels to have edges of similar or substantially the same length to adjacent panels. Such a configuration includes a number of inherent weaknesses. Channel widths dictate panel thicknesses. Known connectors are configured to include uniform panel thicknesses. Additionally, because every panel must fit with a channel of an adjacent connector, the panels cannot overhang a lower panel. Further, as the panel must fit within a channel of an adjacent connector, rain falling upon a panel and running down the panel will necessarily contact the connector holding the edge of the panel. Water collecting within the channel can infiltrate the structure and/or degrade the edges of the panel. Further, replacing a panel wherein the panels are held on all sides by channels is difficult, requiring a substantial portion of the structure to be disassembled to repair the structure.

SUMMARY

A panelized complex polyhedron structure can be constructed quickly and inexpensively from a plurality panels. The structure includes the plurality of panels and connecting features permitting an upper panel of the plurality of panels to overhang an adjacent lower panel of the plurality of panels. The upper panel overhangs to the adjacent lower panel.

BRIEF DESCRIPTION OF THE DRAWINGS

One or more embodiments will now be described, by way of example, with reference to the accompanying drawings, in which:

FIG. 19A illustrates an exemplary rhombic tricontrahedral enclosure with flooring, in accordance with the present disclosure;

FIG. 19B illustrates a detail view of an exemplary wall joining an exemplary floor in FIG. 19A, in accordance with the present disclosure;

FIG. 19C illustrates an additional detail view of an exemplary wall joining an exemplary floor in FIG. 19A, in accordance with the present disclosure.

DETAILED DESCRIPTION

Figure 1:
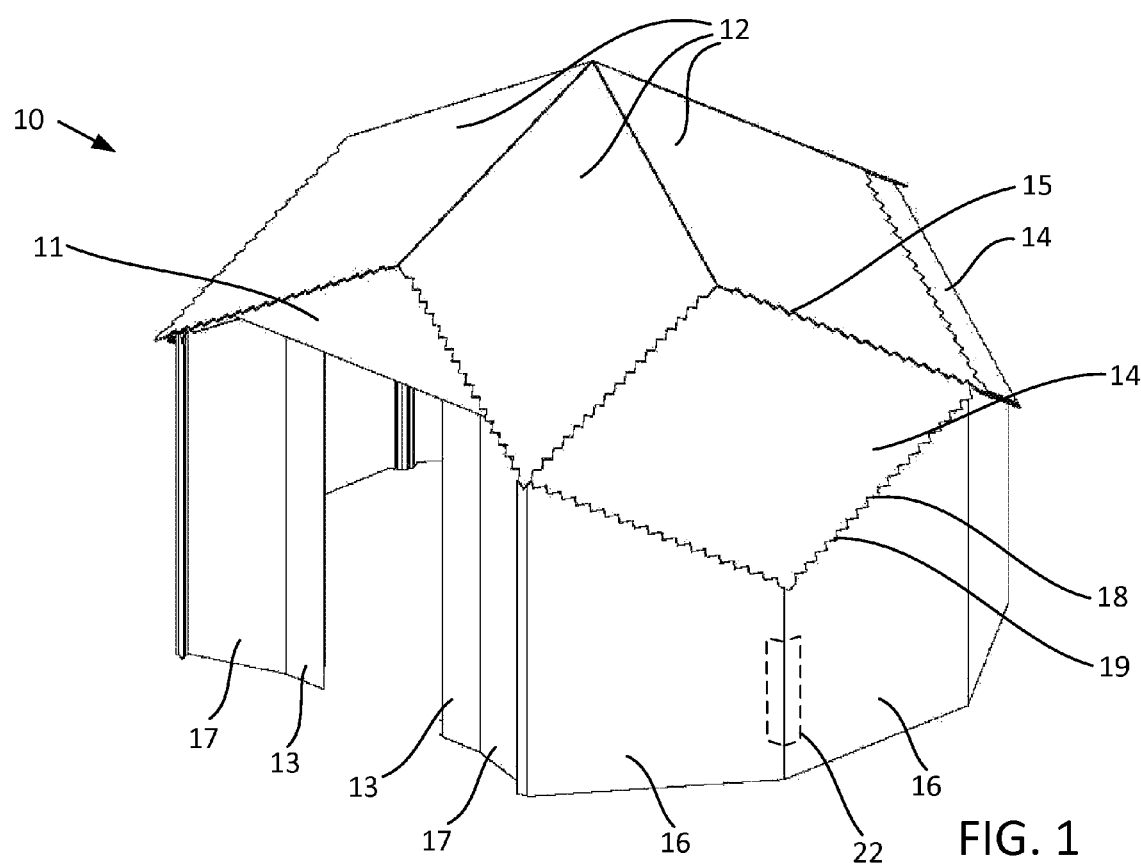
FIG. 1 illustrates an exemplary rhombic tricontrahedral enclosure with overhanging panel edges including serrated edges, in accordance with the present disclosure.

Panelized structures are useful for providing rapidly deployed housing in emergency situations. Panelized structures can provide inexpensive storage solutions as outbuildings. However a panelized structure is utilized, a primary function of a structure is to provide shelter from adverse weather such as rain. A structure fails to adequately protect people and objects within the structure if rain can penetrate or infiltrate past joints between panels and adjacent connectors. A classification or type of connectors is disclosed that enables alternative panel and joint configurations as compared to end to end connectors that hold panel edges. A connector as disclosed herein presents a flat bearing surface to one or both panels being joined by the connector. This flat bearing surface is situated against a flat surface of the adjacent panel, and a fastener or other affixing device or material is applied to affix the panel to the connector. These connectors permit a higher panel to overhang a lower panel, such that rain can drip off of the upper panel onto a central portion of a lower panel, thereby preventing the rain from intruding within the structure at the joint.

As rain falls upon an upper roofing panel of a panelized structure, the water runs down the panel and off the edge, avoiding any contact with the connector holding the panel, the edge of the panel itself, and the edge of an adjacent panel. Instead of two adjacent panels being butted up against each other inside of a connector, if one panel is allowed to hang over the other, any water flow is allowed to run off the edge instead of collecting. This shape is not unlike the overhang of the eves of a roof over a wall of a structure. This disclosed structure configuration prevents water from infiltrating the structure and/or degrading the edges of the panel. Further, this disclosure facilitates the rapid assembly and or disassembly of a panelized structure, allowing the easy replacement of a single panel by removal of a limited number of fasteners, as compared to the labor intensive process to disassemble multiple panels of a structure where the panels are held on all sides by channels.

In one embodiment, an overhanging roof edge can be a straight, smooth edge. In an alternative embodiment, the edge of a panel creating a overhanging roof can include a serrated edge. Such a serrated shape including a series of angled point shapes on a tilted roof panel creates a series of local low points, where water will tend to drip from the angled points. Whereas water running off a panel with a straight edge overhang can tend to wick along the straight edge and collect at a corner of the panel, water running off a panel with serrated edge tends to drip from various the various angled points along the edge.

According to one embodiment, a unique connector configuration can be used to accomplish every panel to panel angle throughout a structure. Any of these connectors can be produced in quantity at a particular length and included with a kit to build a panelized structure. According to another embodiment, a single connector can be utilized including multiple angles required for different panel to panel connections in the structure. In one embodiment, a single connector can include all of the angles required to build the desired structure.

Known connectors utilizing channels to connect panels in a panel edge to panel edge configuration can require a particular thickness of panel to securely hold the panels in place. By using a connector including a flat bearing surface as disclosed herein to secure to one side of a panel, the thickness of the panel is not limited by the thickness of a channel on the connector.

Referring now to the drawings, wherein the showings are for the purpose of illustrating certain exemplary embodiments only and not for the purpose of limiting the same, FIG. 1 illustrates an exemplary rhombic tricontrahedral enclosure 10 comprised of the upper roof panels 12, lower roof panels 14, and the wall panels 16 and 17. Since the wall panels are vertical, an overall height of the structure can be modulated by lengthening the wall panels. A symmetrical structure could include five upper roof panels, and five side unit assemblies, each including a lower panel 14 and two wall panels 16. Such a side unit assembly is characterized by all angles between the panels being 144 degrees. However, one or more of the side unit assemblies can be replaced by a wall panel or wall panels configured to present a door opening. In such an embodiment, an enclosure can have more than one door opening, a pair of wall panels and a lower panel replaced by a flat face wall, or a number of different configurations differing from the typical partial rhombic triacontahedron enclosure shape. In the exemplary embodiment of FIG. 1, wall panels 17, short lower roof panel 11, and door frame panels 13 are provided to present a door opening in enclosure 10.

The various panels of enclosure 10 are joined to respective adjacent panels by panel connector 22. Connector 22 is configured with a plurality of angles built into the connector such that all of the necessary angle connections can be made throughout enclosure 10 with a single design of connector. Connector 22 includes connecting features permitting an upper panel to overhang a lower panel.

Overhanging panels aid in managing water flow over the lower vertical panels. Upper roof panels 12 create an overhanging edge 15 over lower roof panels 14. Similarly, lower roof panels 14 form overhanging panel edges 18 over wall panels 16. In the exemplary embodiment of FIG. 1 each of overhanging edge 15 and overhanging edge 18 include serrated edges 19.

Water flow can be further aided by creating complex shapes on the edges of the panels. Straight edges on the panels can cause water to wick or pool for a period along the edge of a panel. Complex shapes such as the serrated edges 19 of the panels cause water to quickly gather to the tip a serration and drip off of the structure more quickly than if there were merely straight edges on the panels. Such a drainage pattern distributed around the perimeter of enclosure 10 instead of being concentrated at particular points can be useful to preventing pools of water forming on the ground next to and under the enclosure.

Panels used in a structure or enclosure can be made of a number of different materials. In one embodiment, panels can be made of a wood product. Plywood is useful in constructing panels as it is cheap and is moderately resistant to water intrusion. Other wood products can be used. Cheaper wood products such as particle board can be used, although the inherent weakness of such a material to water damage would make a water-proof coating upon such a wood product necessary and cost prohibitive. Plywood or other wood products can be painted or otherwise treated to both increase durability and aesthetic value according to processes known in the art. Non-wood products can also be used to make panels. A panel can be constructed of plastic, PVC, or vinyl, while in another it is made from blown foam. Selection of such a material can be made according to durability of the material to environmental factors such as direct sunlight and temperature extremes and to an ability of the material to maintain a desired shape over time. In another embodiment, panels can be constructed from sheet metal or fiberglass and resin.

Panels and especially roof panels can be coated, treated, or covered with materials to keep water from penetrating into the panel. For example, roof shingles known in the art can be affixed to roof panels. Instead of using a plurality of overlapping rectangular shingle sheets, a similarly constructed single shingle sheet could be tacked, adhered, or otherwise affixed to an outer surface of a panel.

A panel connector can be made of a number of different materials, including plastic or polymer materials. Panel connectors can be made from fiberglass or metal or metallic alloys. They can be either extruded, stamped, injection molded, or machined from a solid piece of metal. In one embodiment, after sheet metal is cut to size and stamped, it is then folded to form the connector. Panels made of sheet metal can include features of a connector created unitarily with the panel.

Figure 2:
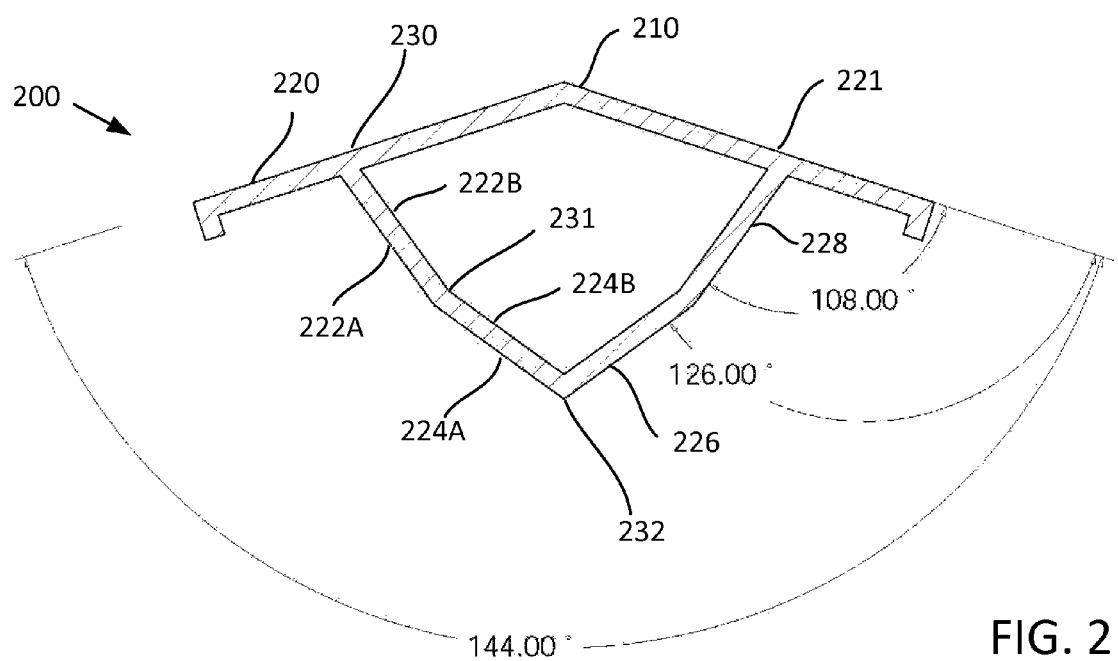
FIG. 2 illustrates an exemplary panel connector with flat bearing surfaces that can be used as a connector for three different angles in a panelized structure, in accordance with the present disclosure.

FIG. 2 illustrates an exemplary connector with flat bearing surfaces that can be used as a connector for three different angles in a panelized structure. Configuration 200 includes connector 210 with flat bearing surfaces 220, 221, 222A, 222B, 224A, 224B, 226, and 228. Throughout an exemplary rhombic tricontrahedral enclosure, a majority of the connectors need to be at 144 degrees. Surfaces 220 and 221 form a 144 degree angle. A panel can be connected to each of surfaces 220 and 221 to create the desired 144 degree connection. Holes can be drilled or formed in locations along the length of the connector to make exemplary fastener connections between the connector and adjacent panels.

Connector 210 can be modified to further act as a connector for a 108 degree angle connection. Connector 210 can be cut along the connector at point 230 and either point 231 or point 232 to form a 108 degree angle connector wherein either surface 222A or surface 222B are used to connect to one panel and surface 220 is used to connect to a second panel. Without cutting the connector, surfaces 220 and 222A can be utilized to make the 108 degree connection. Similarly, connector 210 can be modified to further act as a connector for a 126 degree angle connection. Connector 210 can be cut along the connector at point 230 and point 232 to form a 126 degree angle connector wherein either surface 224A or surface 224B are used to connect to one panel and surface 220 is used to connect to a second panel. Without cutting the connector, surfaces 220 and 224A can be utilized to make the 126 degree connection. It will be noted that the angles formed on the connector are specific to a rhombic tricontrahedral enclosure. A similar connector can be configured for a different geometric panelized structure, such that various angles required to build the structure are included on the connector, and may differ from those angles disclosed here. Points 230, 231, and 232 are exemplary points where the connector could be cut to produce the 108 and 126 degree angle connectors. A number of points where the connector can be cut to make the desired connections are possible on connector 210, and the disclosure is not intended to be limited to the particular examples provided. In one embodiment, a 162-degree connector can be useful for construction, and surfaces 226 and 228 and can be used to join two panels together at 162 degrees. Connector 210 is versatile and can connect walls at several differing angles. Connector 210 can be metallic, an extruded plastic or polymer piece configured to run a length of adjacent panels. Connector 210 can be formed according to a number of exemplary manufacturing processes known in the art and as disclosed herein.

Figure 3:
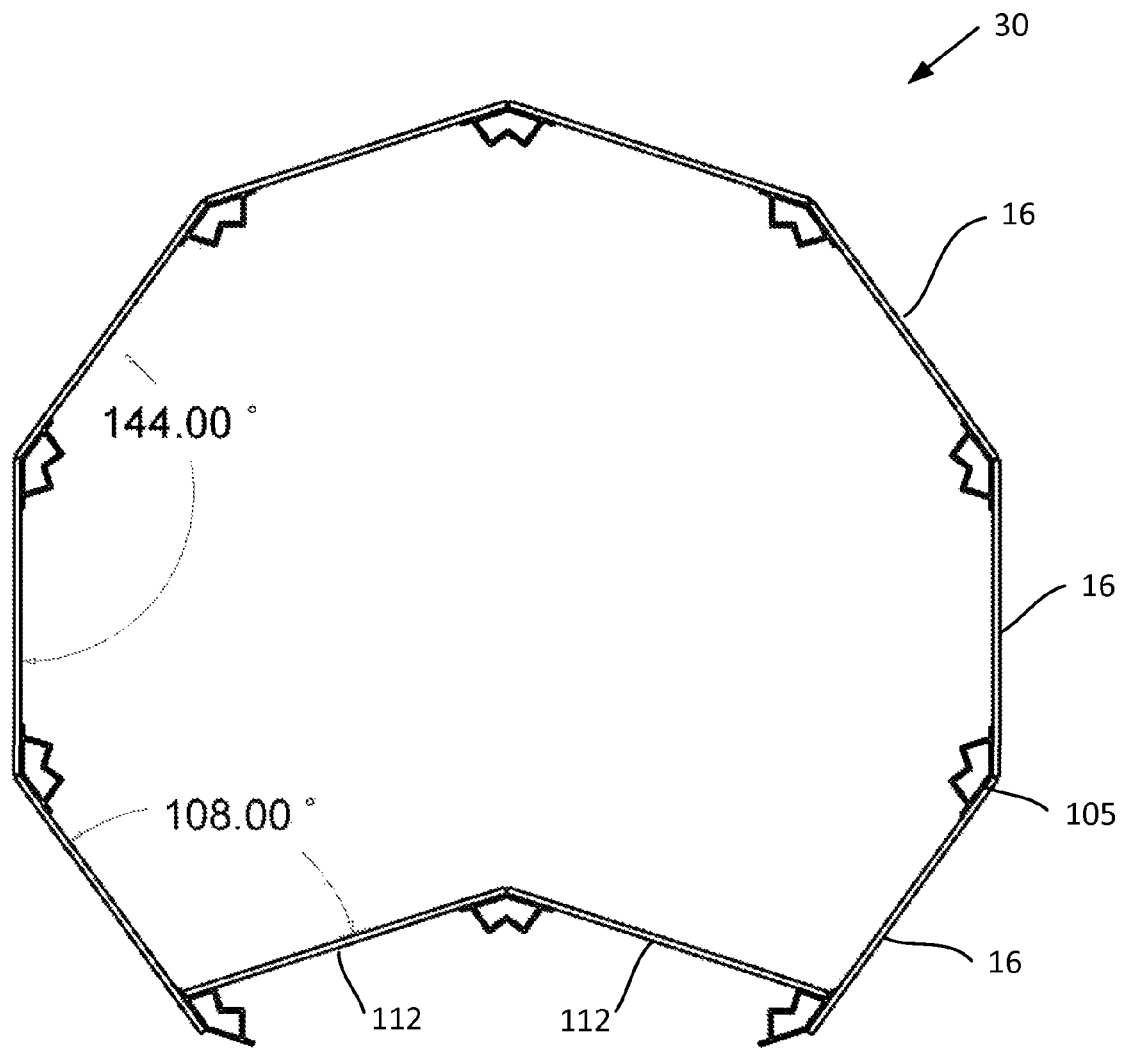
FIG. 3 illustrates a top-down view of an exemplary enclosure with multiple angles forming two adjoining walls of the doorway, in accordance with the present disclosure.

FIG. 3 illustrates a top-down, sectional view of an exemplary enclosure 30 with adjoining walls joined at multiple angles by connectors 105. Vertical wall 16 joins an adjoining vertical wall 16 at an angle of 144 degrees. Vertical wall 16 joins vertical wall 112 by means of a different side of connector 105, forming an angle of 108 degrees. One or both of vertical walls 112 can include a cutout for a doorway. On the other side of vertical wall 112 is an adjoining vertical wall 112, joined at an angle of 144 degrees.

Figure 4:
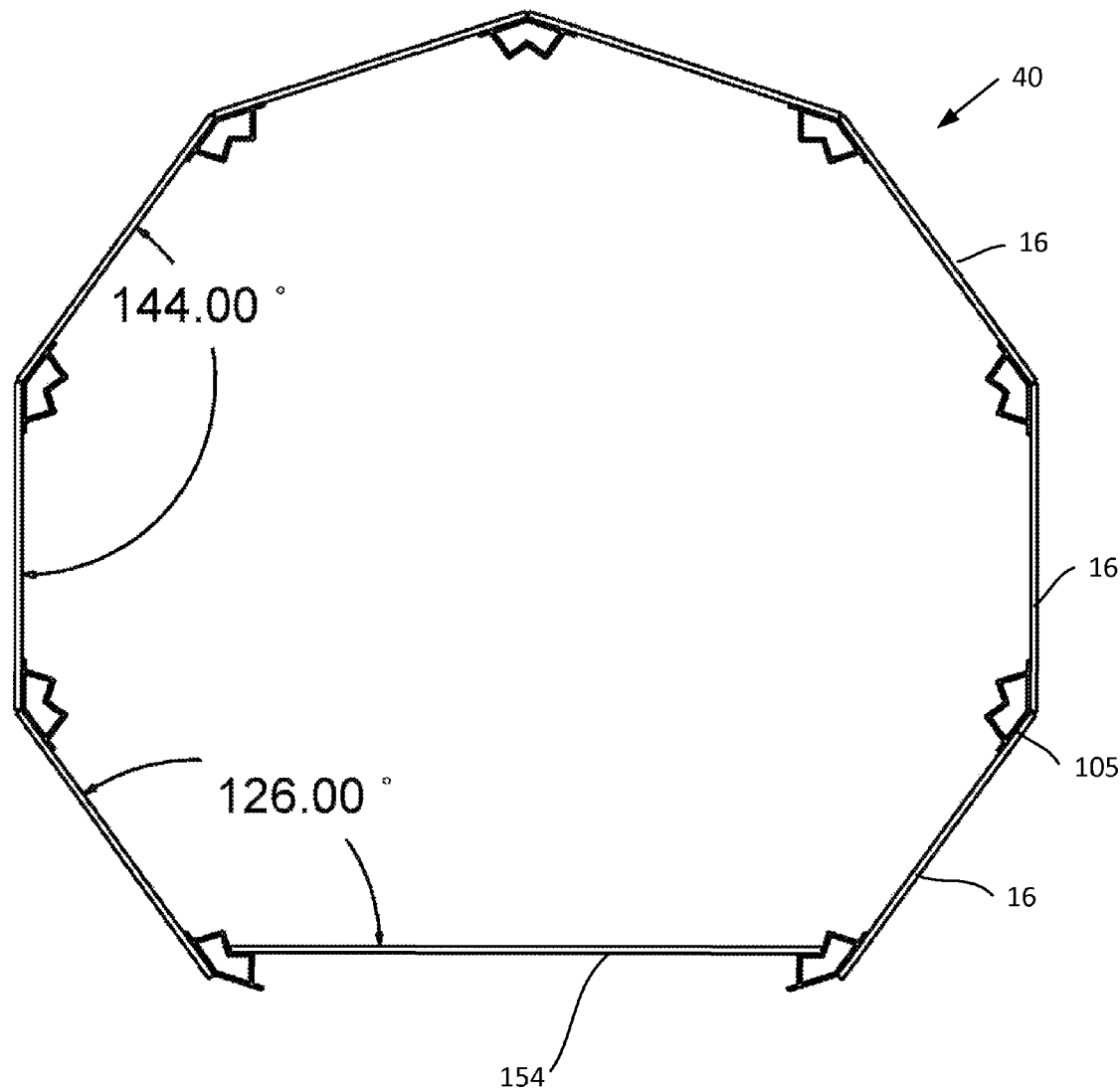
FIG. 4 illustrates a top-down view of an exemplary enclosure with two angles forming one wall of the doorway, in accordance with the present disclosure.

FIG. 4 illustrates a top-down, sectional view of an exemplary enclosure 40 with adjoining walls joined at multiple angles by connector 105. Vertical wall 16 joins an adjoining vertical wall 16 at an angle of 144 degrees. Vertical wall 16 joins vertical wall 154 by means of a different side of connector 105, forming an angle of 126 degrees. Vertical wall 154 can include a cutout for a doorway. On the other side of vertical wall 154 is an adjoining vertical wall 16, joined at an angle of 126 degrees.

Figure 5:
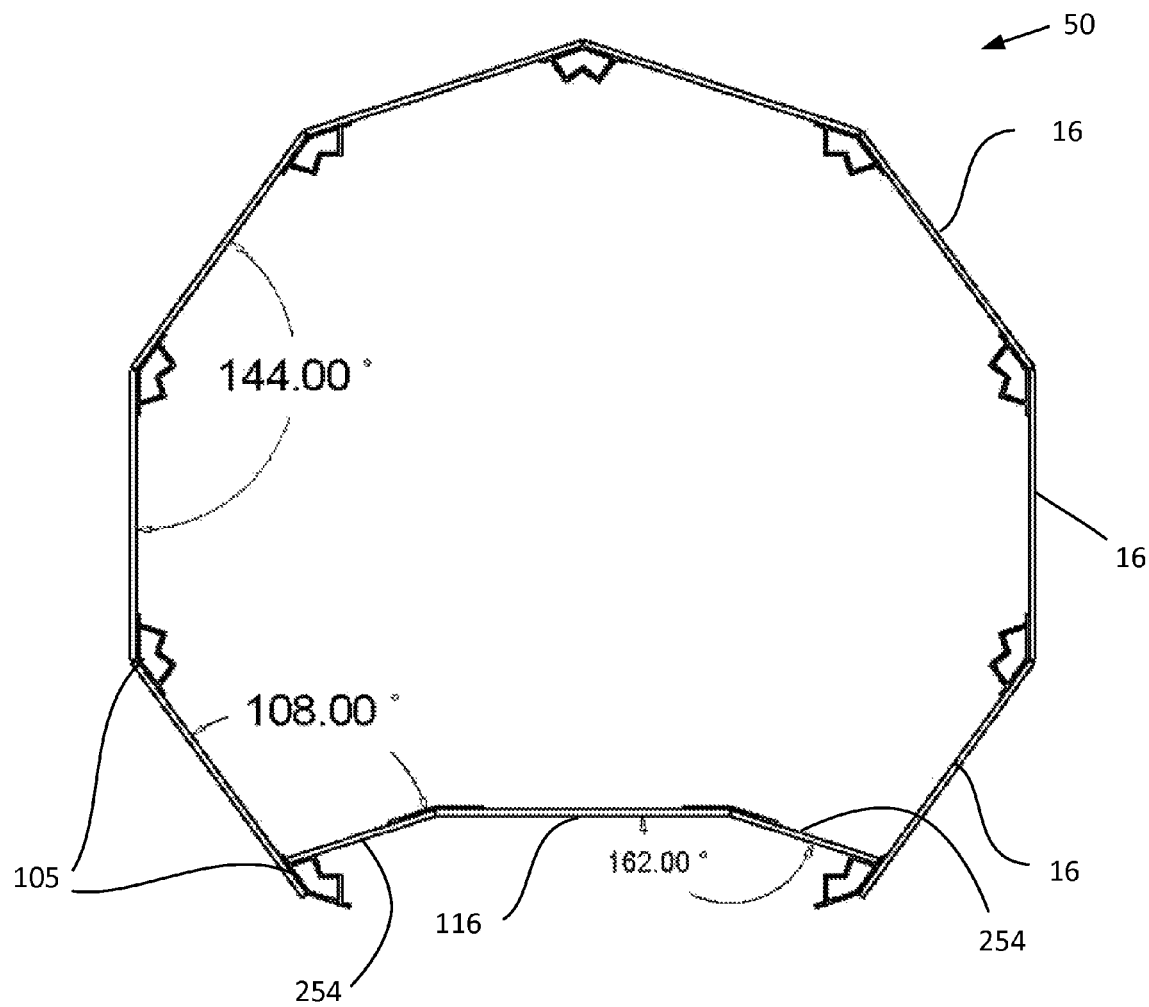
FIG. 5 illustrates a top-down view of an exemplary enclosure with multiple angles forming three adjoining walls of the doorway, in accordance with the present disclosure.

FIG. 5 illustrates a top-down, sectional view of an exemplary enclosure 50 with adjoining walls joined at multiple angles by connector 105. Vertical wall 16 joins an adjoining vertical wall 16 at an angle of 144 degrees. Vertical wall 16 joins vertical wall 254 by means of a different side of connector 105, forming an angle of 108 degrees. On the other side of vertical wall 254 is an adjoining vertical wall 116, joined at an angle of 162 degrees. Vertical wall 116 can include a cutout for a doorway. Adjoining this vertical wall 116 is a second vertical wall 254 at an angle of 162 degrees. The other side of vertical wall 254 is joined at an angle of 108 degrees by connector 105 to vertical wall 16, forming the rest of the doorway.

Figure 6:
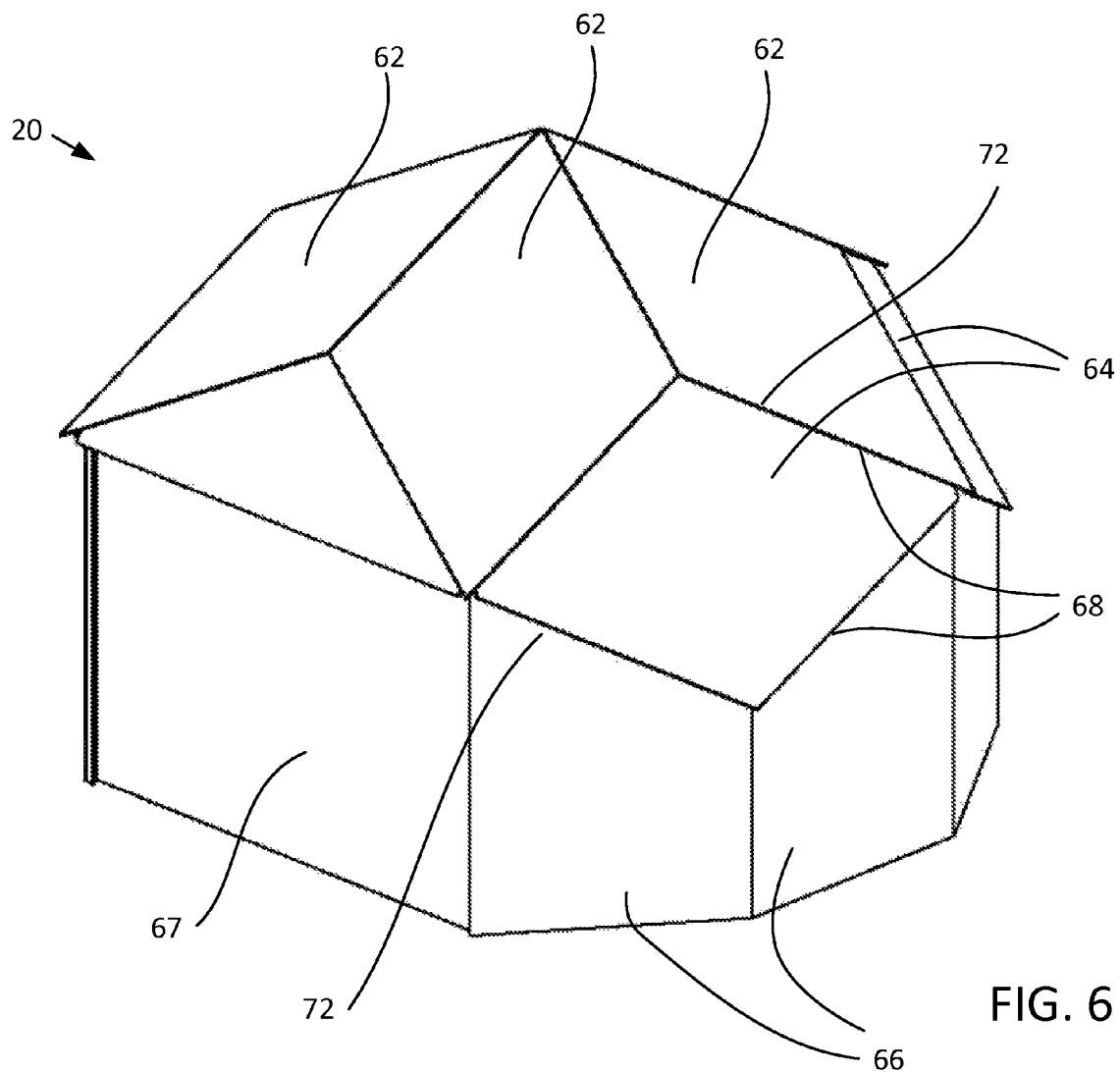
FIG. 6 illustrates exemplary enclosure with overhanging panel edges including straight eave edges, in accordance with the present disclosure.

FIG. 6 illustrates exemplary rhombic tricontrahedral enclosure 20 comprised of the upper roof panels 62, lower roof panels 64, and the wall panels 66 and 67. The upper roof panels 62, the lower roof panels 64, and the panels 66 and the panels 67 are joined to adjacent panels by one or more panel connector designs. As disclosed herein, each required angle can have a dedicated, unique connector, or a single connector can include features enabling connection of panels at a number of different angles. Upper roof panels 62 and lower roof panels 64 can form an overhang edge 68 including straight eave edge 68.

Figure 7A:
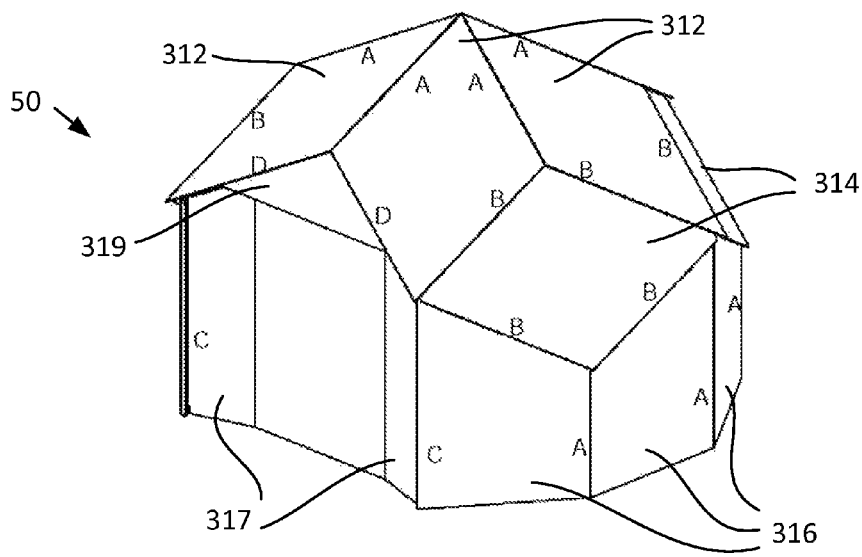
FIG. 7A illustrates an exemplary enclosure with both overhanging panel edges and flush panel edges with each edge labeled and described in further detail in subsequent figures.

FIG. 7A illustrates an exemplary rhombic tricontrahedral enclosure 70 including roof panels 312, 314, and 319 and wall panels 316 and 317. A number of exemplary joint configurations are illustrated. Joints labeled "A" include a 144 degree connection with no overhang. Joints labeled "B" include a 144 degree connection with an overhang. Joints labeled "C" include a 108 degree connection with no overhang. Joints labeled "D" include a 144 degree connection with an overhang and a 108 degree connection with no overhang.

Figure 7B:
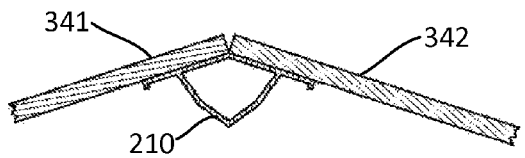
FIG. 7B illustrates in detail the usage of a panel connector of FIG. 7A, in accordance with the present disclosure.
Figure 7C:
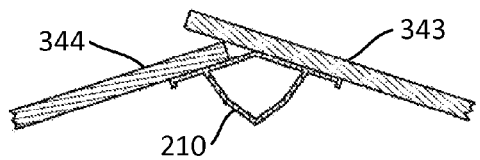
FIG. 7C illustrates in further detail the usage of a panel connector of FIG. 7A, in accordance with the present disclosure.
Figure 7D:
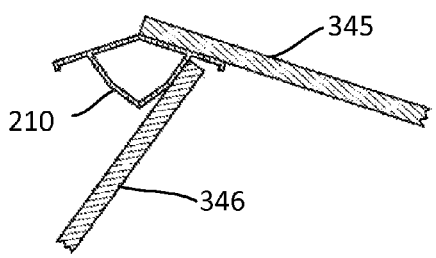
FIG. 7D illustrates in further detail the usage of a panel connector of FIG. 7A, in accordance with the present disclosure.
Figure 7E:
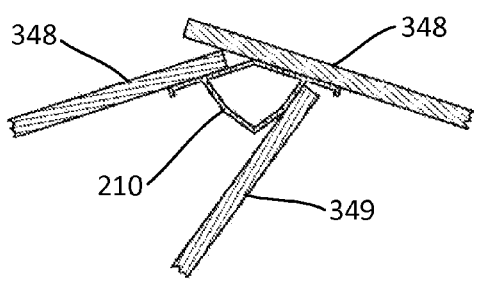
FIG. 7E illustrates in further detail the usage of a panel connector of FIG. 7A, in accordance with the present disclosure.

FIG. 7B illustrates in detail joints labeled "A" in FIG. 7A. Connector 210 connects panel 341 and panel 342. Panels 341 and 342 can include upper roof panels 312 or wall panels 316. FIG. 7C illustrates in detail joints labeled "B" in FIG. 7A. Connector 210 connects panel 343 and panel 343. Panels 341 and 342 can include upper roof panels 312 overhanging lower roof panel 314 or lower roof panel 314 overhanging wall panel 316. FIG. 7D illustrates in detail joints labeled "C" in FIG. 7A. Connector 210 connects panel 345 and panel 346. Panels 345 and 346 can include wall panel 316 connecting to wall panel 317. FIG. 7E illustrates in detail joints labeled "D" in FIG. 7A. Connector 210 connects panel 348 to both panels 347 and 349. Panels 348 and 347 can include upper roof panels 312 overhanging roof panel 319, and panel 349 can include wall panel 317 attaching to roof panel 312. The exemplary connections of FIGS. 7A-7E are exemplary for the particular illustrated enclosure, and it will be appreciated that a different shape of enclosure with particular angles thereto could be similarly illustrated and configured.

Figure 8A:
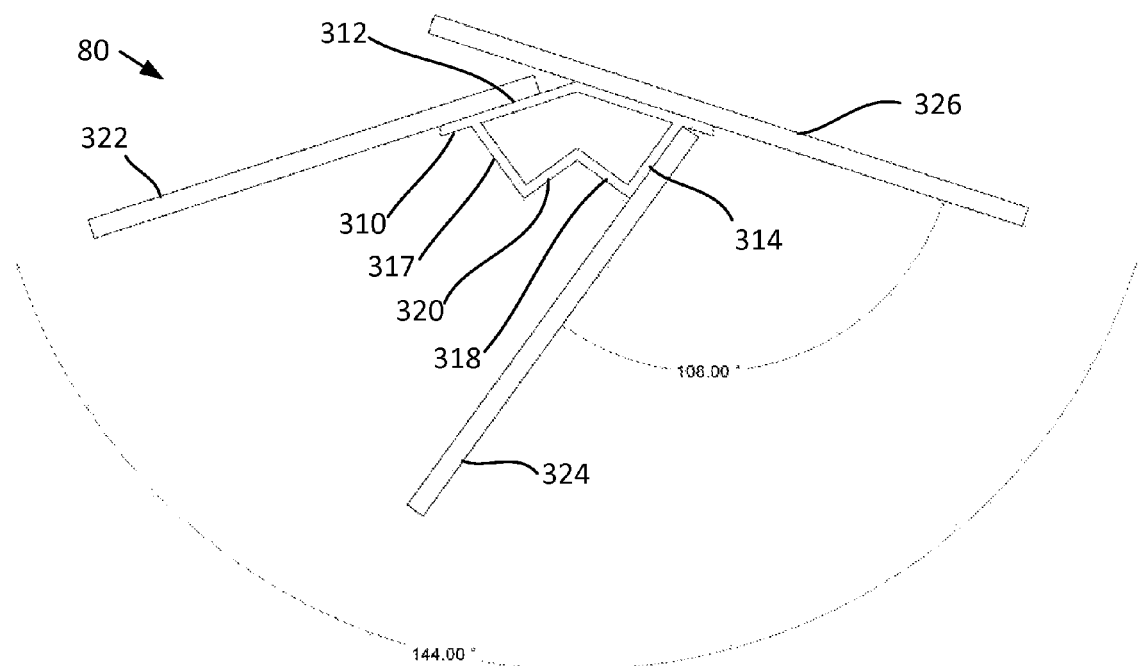
FIG. 8A illustrates a connector in cross-section, including two flat bearing surfaces, in accordance with the present disclosure.

FIG. 8A illustrates an exemplary alternative embodiment of a connector in cross-section, utilizing three flat bearing surfaces to join three panels together. Configuration 80 includes connector 310 with flat bearing surfaces 312, 314 and 316, 317, 318 and 320. Panel 326 is connected to bearing surface 316, and panel 324 is attached to bearing surface 314. A third panel 322 can be connected to bearing surface 312. While these three panels are represented, other angles can be obtained from surfaces 317, 318, and 320 located on panel connector 310.

Figure 8B:
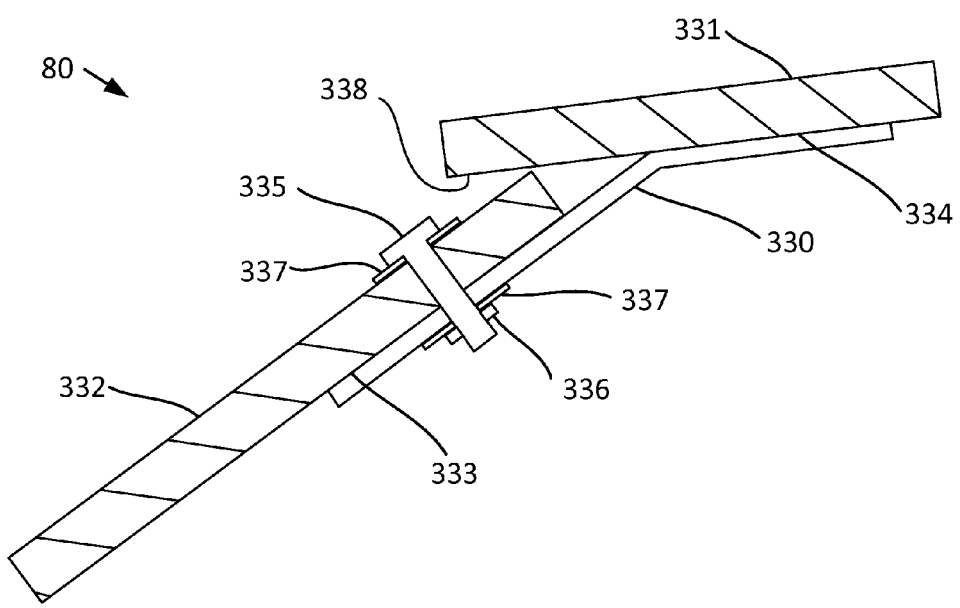
FIG. 8B illustrates a fastener illustrated in used to secure a panel to a single angle connector, in accordance with the present disclosure

FIG. 8B illustrates another exemplary embodiment of a connector in cross section joining two adjacent panels. Connector 330 is provided as a connector providing a unique angle, in this example, a 144 degree connection. Panel 331 is connected to flat bearing surface 334 of connector 330, and panel 332 is connected to flat bearing surface 333 of connector 330. An exemplary fastener 335 is provided connecting panel 332 to connector 330. Nut 336 and washers 337 are illustrated with fastener 335 to provide a threaded bolt and nut fastener connection known in the art. Holes or slots on both panel 332 and connector 330 can be provided with dimensions permitting minor adjustments or permitting assembly of the panels even when the panels are not perfectly aligned.

In one embodiment, instead of using nuts and bolts to fasten panels to the panel connectors, the panels are glued or otherwise adhered to each other. In one embodiment, pop-rivet fasteners are utilized to fasten the panels to the panel connectors. In one embodiment, portions of the panel connectors have threaded holes that accept machine screws.

In one embodiment, the panels have studs, or protrusions that are accepted into mating receptacles, located on the panel connectors. In another embodiment, a magnetic force is utilized to adhere panels to the panel connectors, or by any other connection method known in the art.

Figure 9:
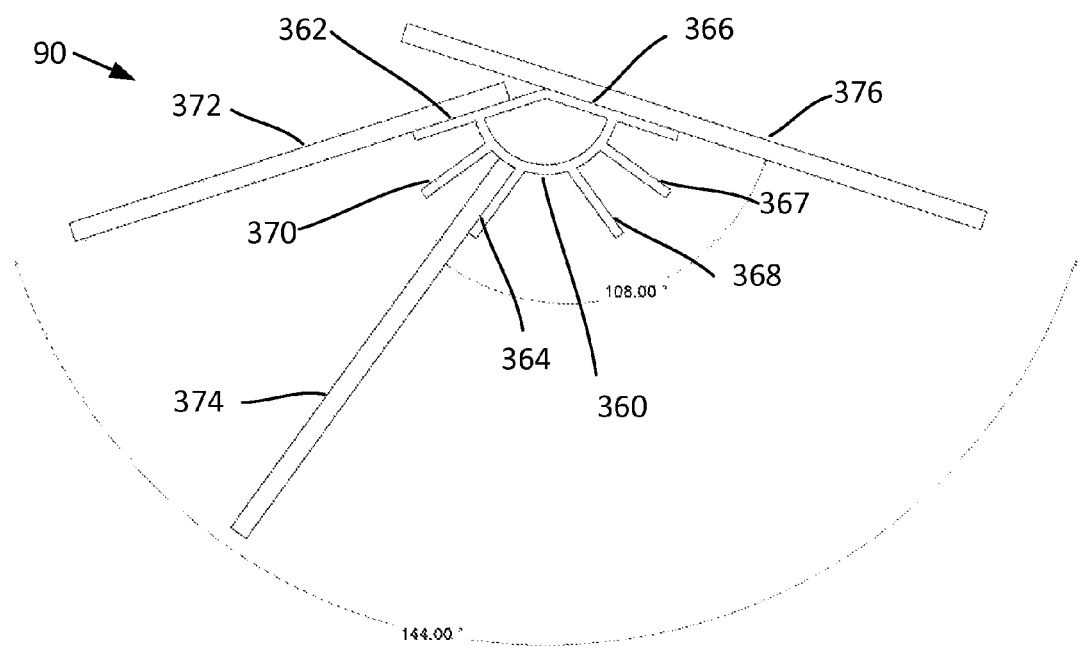
FIG. 9 illustrates an alternative embodiment of a connector in cross-section, including flat bearing surfaces, in accordance with the present disclosure.

FIG. 9 illustrates another exemplary embodiment of a connector in cross-section, utilizing three flat bearing surfaces to join three panels together. Configuration 90 includes connector 360 with flat bearing surfaces 362, 364 and 366, 367, 368 and 370. Panel 376 is attached to bearing surface 366, and panel 274 is attached to bearing surfaces 364. Panels 374 and 376 form an angle of 108 degrees. Panel 372 is attached to bearing surface 362. Panels 372 and 376 form an angle of 144 degrees. While these three panels are represented, other angles can be achieved by attaching panels to surfaces 367, 368, and 370 located on connector 360. Based upon different designs of the enclosure or structure being built, different angles can be configured upon the connector.

Figure 10:
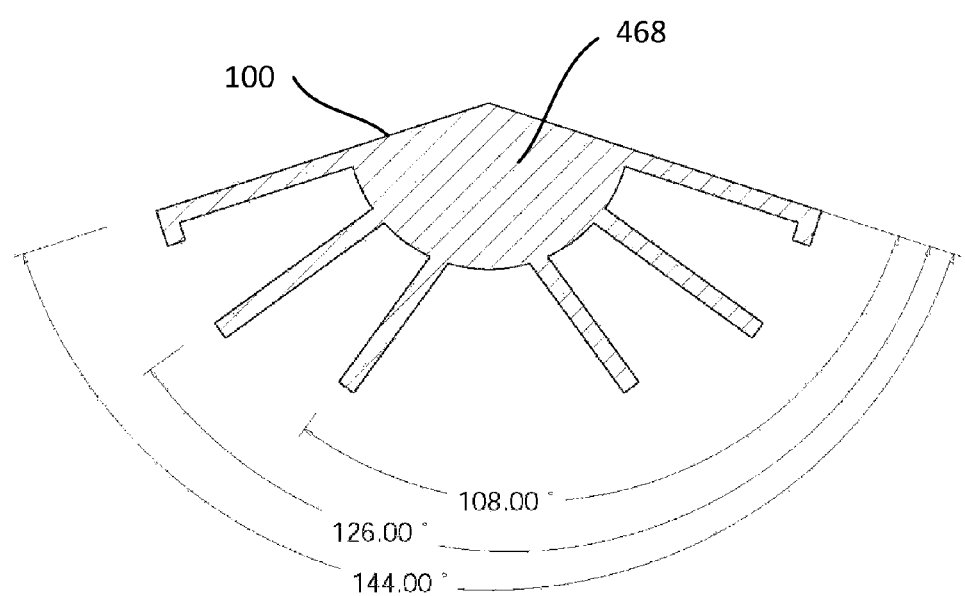
FIG. 10 illustrates a connector in cross-section, capable of connecting panels at multiple angles illustrating a solid core, in accordance with the present disclosure.

FIG. 10 illustrates in cross-section panel connector 100. Connector 100 is similar to connector 90 of FIG. 9 with the exception that a center of panel connector 100, core 468, is solid. In an alternative embodiment, core 468 a core of the connector can be mostly solid with hollowed out reliefs formed into the core.

Connectors are disclosed herein that can be affixed to flat bearing surfaces with a threaded fastener, a snap-fit fastener, an adhesive or caulking agent, or by any other connection method known in the art. In one embodiment, a group of panels forming a roof can be set upon a group of panels forming a base, and the roof can be held upon the base by the weight of the roof. In one embodiment, this base can include additional panels overhanging lower panels to prevent water from intruding through lower joints between panels. In some embodiments, a pin, rivet, or post can be affixed to a panel prior to assembly of the structure in order to guide assembly to or fasten to an adjoining connector.

Figure 11:
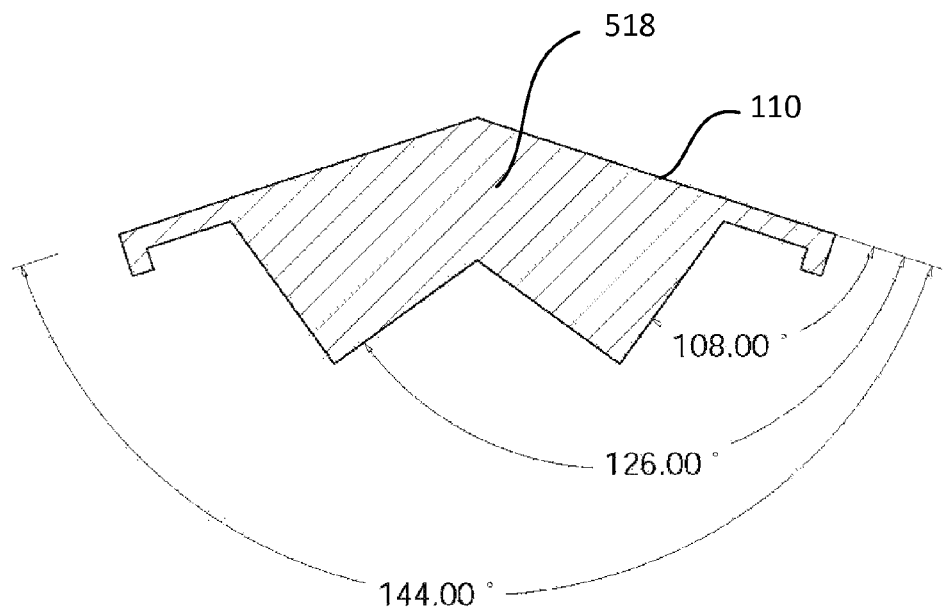
FIG. 11 illustrates an alternative embodiment of a connector in cross-section, illustrating a solid core, in accordance with the present disclosure.

FIG. 11 illustrates in cross-section an additional embodiment of a connector with a solid core. A center of panel connector 110, core 518, is solid.

Figure 12:
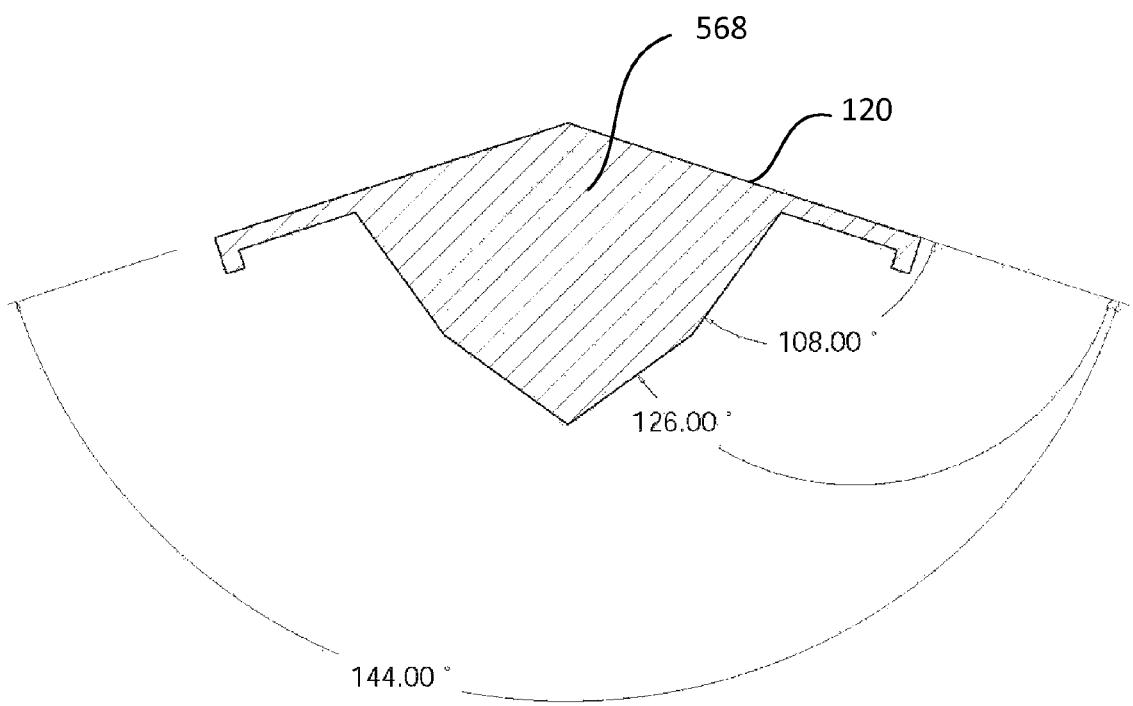
FIG. 12 illustrates an alternative embodiment of a connector in cross-section, illustrating a solid core, in accordance with the present disclosure.

FIG. 12 illustrates in cross-section another embodiment of a connector with a solid core. A center of panel connector 120, core 568, is solid.

Figure 13:
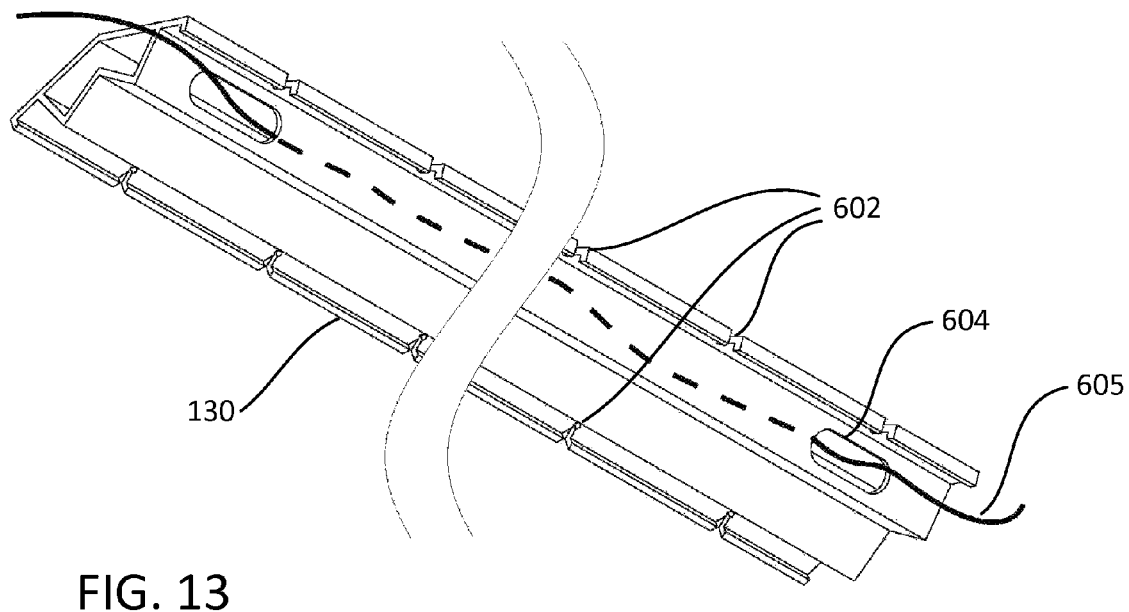
FIG. 13 illustrates a portion of an alternative embodiment of a connector, in accordance with the present disclosure.

FIG. 13 illustrates an exemplary connector with a cross-section similar to the connector in FIG. 8A, with additional features illustrated relating to a snap fit connector configuration and access holes configured to enable providing electrical wiring through the connector. Connector 130 is illustrated with attachment slots 602 and access slot 604. Attachment slots 602 are repeated periodically down a length of each side of connector 130. Features upon a connector as disclosed herein for receiving a fastener can take any of a number of embodiments known in the art. In the exemplary embodiment of FIG. 13, slots 602 are "V" shaped to encourage easy installation. Further, each slot 602 can include a detent or narrow section to facilitate a stud or other post located on a panel snapping into place within slot 602 and remaining affixed to the slot. Connector 130 is hollow, and wiring 605 can be threaded through the hollow portion to provide a conduit to protect the wiring as it is routed through the enclosure. Access slot 604 illustrates an exemplary method to provide access for wiring 605 into the hollow center of connector 130.

In one embodiment, raised protrusions are distributed on the surface on panel connector 130, designed to protrude through receiving holes in panels. In one embodiment, panel connector 130 is made from a casting or 3-D printing, and the protrusions are of a metallic or similar material so that after protruding through holes in the panels, a hammer or similar tool can flatten a head onto them to secure them.

In an alternative embodiment, the above-mentioned protrusion has a sharpened point and punctures a hole through a panel when force is applied, eliminating the need to drill on site or pre-drill holes. After being driven through, the sharpened points are flattened into a rivet-type head to secure the panel in place.

Figure 14:
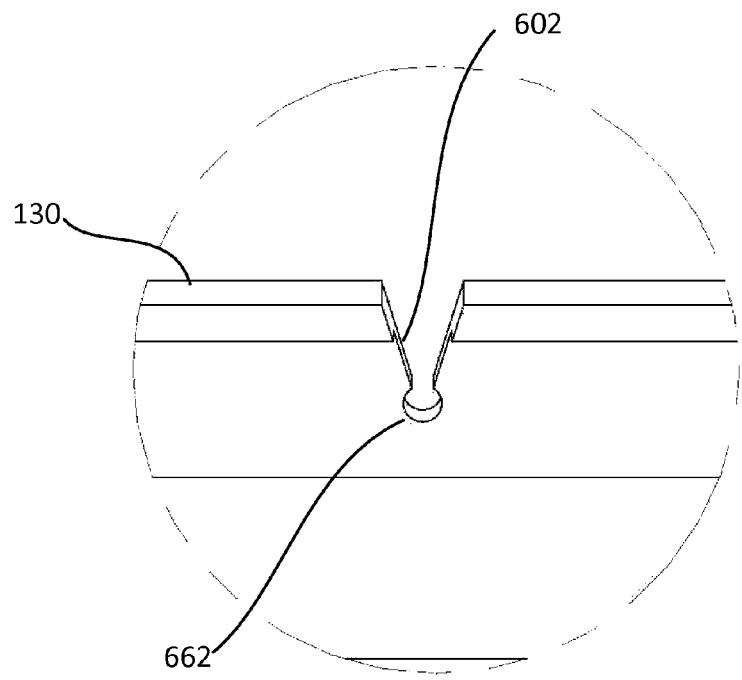
FIG. 14 illustrates a portion of the connector of FIG. 13, in accordance with the present disclosure.

FIG. 14 illustrates a portion of a connector 130. Attachment slot 602 is "V" shaped; wide at its opening and narrowing near its end. This narrowing channel acts as an assembly aid, allowing for imperfect fits to still align and facilitates rapid assembly. At the terminal end of attachment slot 602 is receiving hole 662. In one embodiment, receiving hole 662 is instead an elongated slot, centered where receiving slot 662 is presently located but elongated to either side. This has the advantage to being more forgiving of minor assembly errors.

Figure 15:
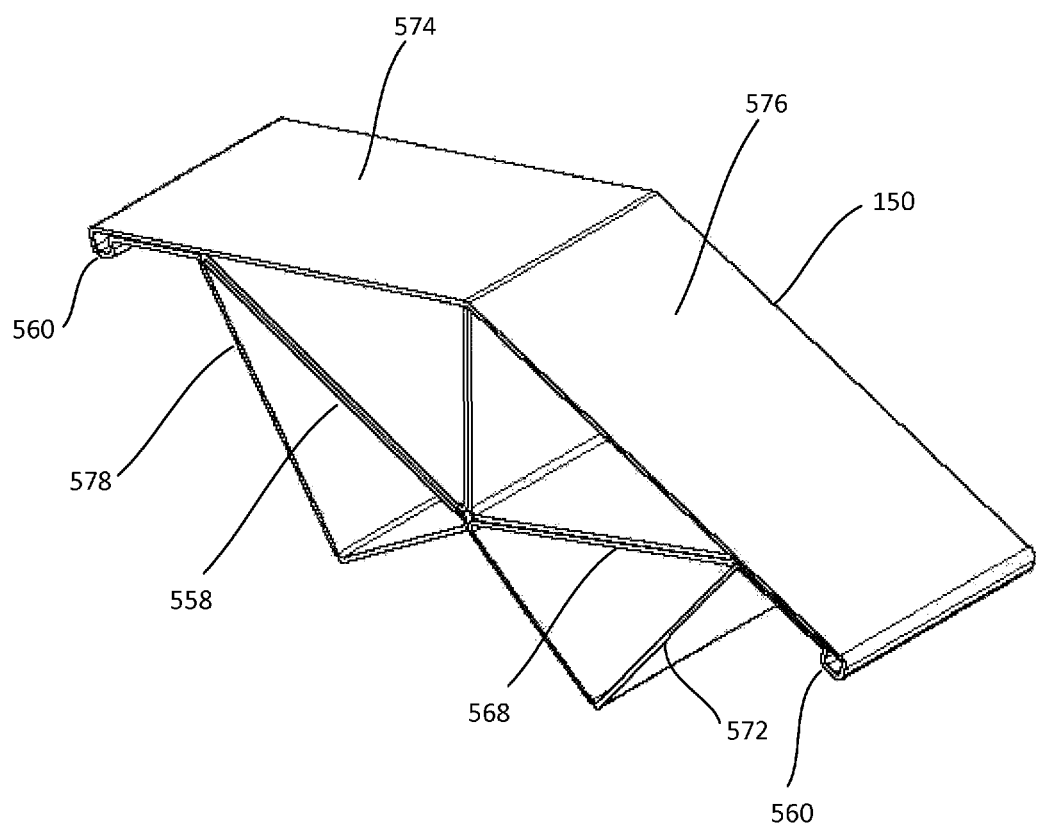
FIG. 15 illustrates a connector in cross-section, constructed from folded metal, in accordance with the present disclosure.

FIG. 15 illustrates in cross-section an exemplary connector constructed from folded metal. Connector 150 can be created from an initially straight strip of metal, and the strip can be mechanically bent in an automated bending machine known in the art. Connector 150 includes folded sections 558 and 568 providing structural support. Connector 150 includes flat bearing surfaces 572, 574, 576, and 578. Surfaces 574 and 576 form a 144 degree angle while surfaces 578 and 572 form other angles. In one embodiment, angles other than 144 degrees are employed for surfaces 574 and 576.

Feature 560 refers to the ends of surface 574 and surface 576 being folded over for additional rigidity and strength. Holes for attachment of a fastener to an adjacent panel can be placed upon any of the bearing surfaces of the connector.

Figure 16:
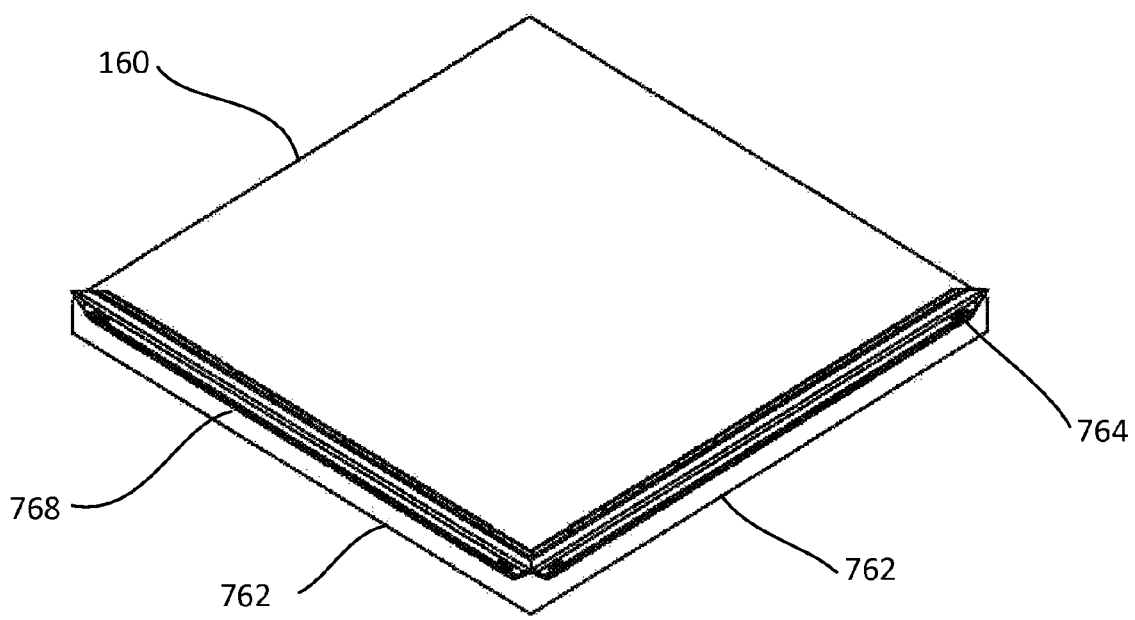
FIG. 16 illustrates a sheet metal roof panel with straight edges, in accordance with the present disclosure.

FIG. 16 illustrates an exemplary panel constructed of sheet metal. Panel 160 is illustrated with straight edges 762. The corners of straight edge 762 can be notched to allow for ease of assembly. Attachment edge 768 provides connecting features, embodied by exemplary mounting slot 764, to attach roof panel 160 to an adjacent panel or connector. The connecting features are configured to permit panel 160 to overhang a lower panel. Several mounting slots 764 can be configured to each attachment edge 768. Attachment edges 768 can be located to every edge of panel 160. Attachment edges can be similar to all panels. In another embodiment, one can have a simple straight surface on one panel, and a connector configured on the mating panel.

Figure 17:
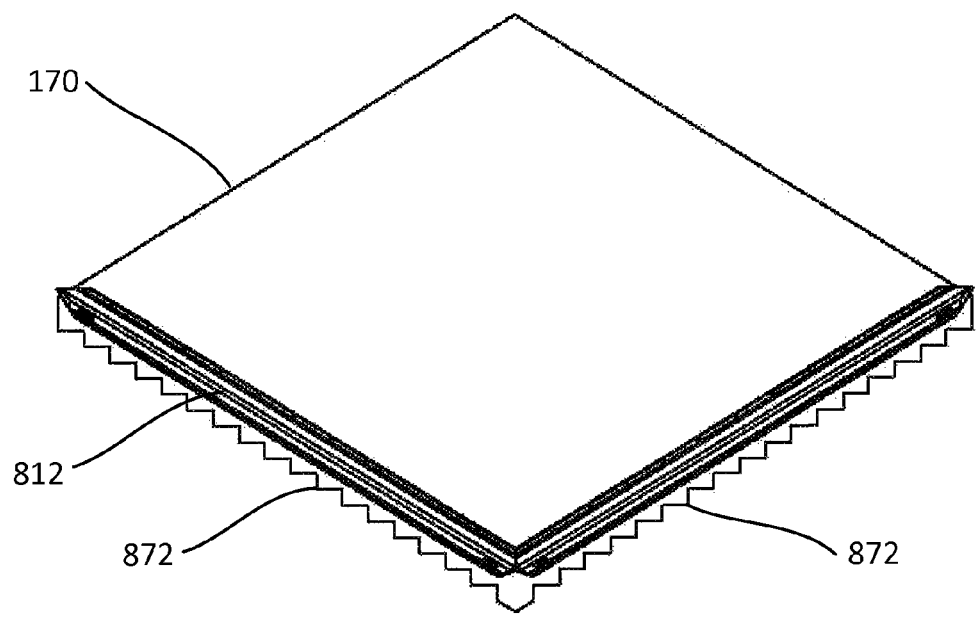
FIG. 17 illustrates a sheet metal roof panel with modified or serrated edges, in accordance with the present disclosure.

FIG. 17 illustrates another exemplary panel constructed of sheet metal. Panel 170 including attachment edges 812 is similar to panel 160 of FIG. 16 except that panel 170 includes modified edges 872 including serrated edges configured to manage runoff according to embodiments of the disclosure. Edges of panel 160 or panel 170 can be rounded, crimped, or otherwise processed to remove sharp edges from the panels. The panels of FIGS. 16 and 17 can be constructed of any of a number of metal sheet materials. In another embodiment, panels can be constructed with attachment edges identical or similar to the edges of panels 160 and 170 with plastics or other polymer materials. Any number of materials can be used to make panels as disclosed herein, and the disclosure is not intended to be limited to the particular examples provided herein.

Figure 18:
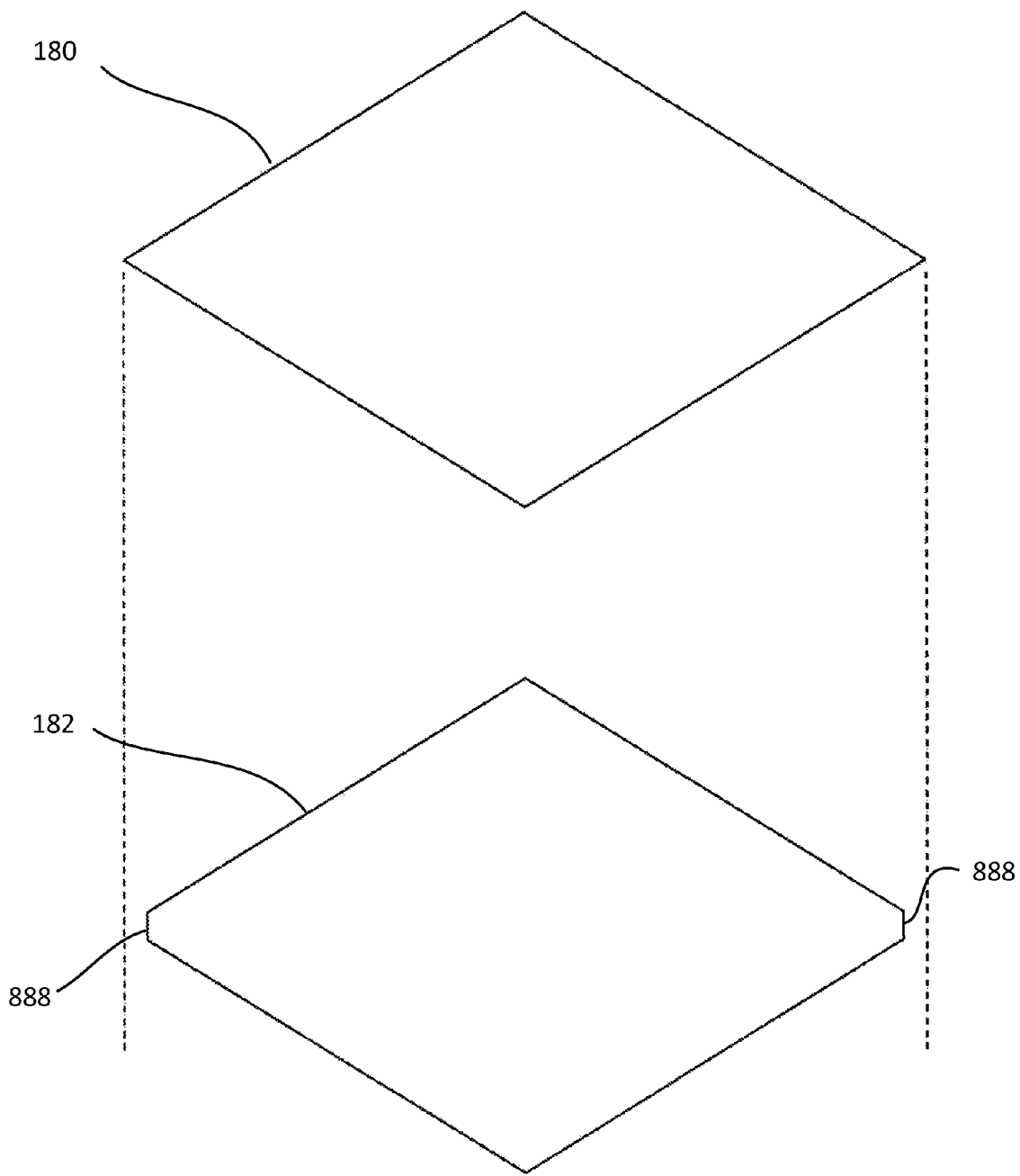
FIG. 18 illustrates upper and lower roof panels, in accordance with the present disclosure.

FIG. 18 illustrates an exemplary embodiment of upper roof panel 180 and lower roof panel 182. Upper roof panel 180 and lower roof panel 182 have similar dimensions, except that lower roof panel 182 has optional corners 888 chamfered as an aid in assembly. Corners of the lower roof panel, if the panel is slightly misaligned, can make alignment and assembly of the upper roof panel to the enclosure difficult. Corners 888, removing the corner of the panel, eases alignment and assembly of the panels.

FIG. 19A illustrates an exemplary rhombic tricontrahedral enclosure 190 comprised of roof panels and wall panels 916. A plurality of exemplary triangular floor panels 924 are illustrated. In one embodiment, floor panels 924 rest upon the ground surface 911, and wall panels 916 rest upon the floor surface created by panels 924. In another embodiment, wall panels 916 rest upon ground surface 911, and floor panels 924 are configured to fit within enclosure 190. Floor panels can be constructed of a number of materials, including wood panels, polymer materials, metal grating, or other similar materials.

FIG. 19B illustrates a detailed view of an exemplary joint between wall panel 916 and floor panel 924. Step 928 is illustrated on the bottom of floor panel 924. Wall panel 916 rests upon step 928, such that any minor ground water only comes into contact with floor panels 924, and both wall panel 916 and an interior of the enclosure can be resistant to intrusion by the water.

FIG. 19C illustrates an additional detailed view of the joint between wall panel 916 and floor panel 924 of FIG. 19B. Step 928 is illustrated on the bottom of floor panel 924, and wall panel 916 include an optional notch 929 cut to fit upon step 928.

Figure 20:
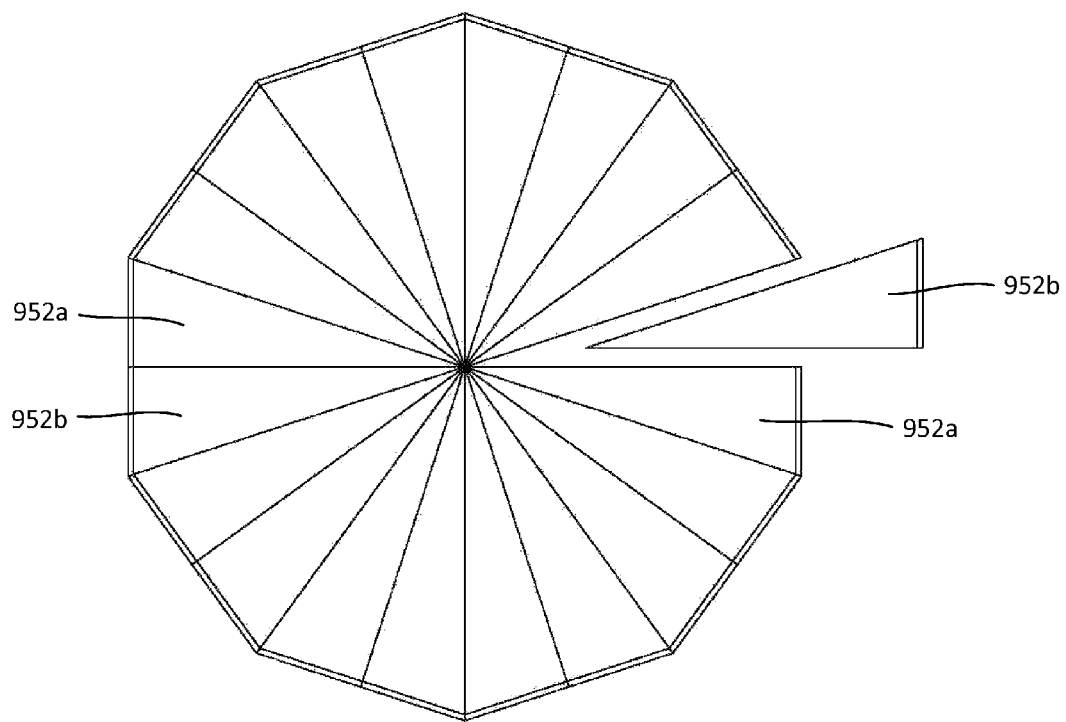
FIG. 20 illustrates a radially segmented floor of an exemplary rhombic tricontrahedral enclosure, in accordance with the present disclosure.

FIG. 20 illustrates a radially segmented floor of an exemplary rhombic tricontrahedral enclosure. Several floor panels 952a and 952b assemble to create the floor. According to the exemplary embodiment of FIG. 20, the floor panels can be cut from a single rectangular sheet of plywood, a diagonal cut of the rectangular piece creating two right angle triangle sections forming floor panels 952a and 952b, saving manufacturing costs and storage space as compared to forming unique floor panels.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A panelized complex polyhedron structure, comprising:
   a plurality of flat panels, each of the panels comprising two flat face surfaces and edge surfaces running around a perimeter of the face surfaces; and
   a plurality of panel connectors, each panel connector comprising:
   two planar surfaces aligned at an angle of one hundred forty four degrees from each other, each planar surface configured to connect a first panel of the plurality of panels and a second panel of the plurality of panels at the angle of one hundred forty four degrees; and two panel connection surfaces aligned at an angle comprising one of one hundred twenty six degrees and one hundred eight degrees and configured to connect a third panel of the plurality of flat panels and a fourth panel of the plurality of panels at the angle comprising one of one hundred twenty six degrees and one hundred eight degrees with the two panel connection surfaces;

wherein a face surface of the first panel abuts next to a first of the two planar surfaces of an adjoining connector of the plurality of connectors and an edge surface of the first panel extends past the adjoining connector and overhangs the second panel abutting a second of the two planar surfaces of the adjoining connector.

2. The polyhedron structure of claim 1, wherein the plurality of panels are configured to form a partial rhombic triacontahedron enclosure.

3. The polyhedron structure of claim 2, wherein the first panel includes a straight edge.

4. The polyhedron structure of claim 2, wherein the first panel includes a serrated edge.

5. The polyhedron structure of claim 2, wherein a plurality of upper panels overhang a plurality of lower panels; and
wherein each of the upper panels overhanging one of the lower panels includes a serrated edge.

6. The polyhedron structure of claim 1, wherein one of the two planar surfaces and the two panel connection surfaces includes a hole configured to receive a fastener.

7. The polyhedron structure of claim 1, wherein one of the two planar surfaces and the two panel connection surfaces includes "V" shaped slot configured to receive a fastener.

8. The polyhedron structure of claim 1, wherein the connector comprises a hollow core.

9. The polyhedron structure of claim 8, wherein the connector is configured to act as a conduit for wiring within the hollow core.

10. The polyhedron structure of claim 8, wherein the connector comprises a solid core.

11. The polyhedron structure of claim 1, further comprising a shingle affixed to one of the panels.

12. The polyhedron structure of claim 1, further comprising a floor surface comprising a plurality of triangular floor sections.

13. The polyhedron structure of claim 12, wherein wall panels of the structure are configured to sit upon the floor surface.

14. The polyhedron structure of claim 1, wherein one of the panels is constructed of sheet metal.

15. The polyhedron structure of claim 14, wherein the panel constructed of sheet metal comprises the connecting features.

16. The polyhedron structure of claim 1, wherein the panel comprises the connecting features.

17. A panelized partial rhombic triacontahedron enclosure, comprising:
a plurality of flat panels, each of the panels comprising two flat face surfaces and edge surfaces running around a perimeter of the face surfaces; and
a plurality of panel connectors, each panel connector comprising:
two planar surfaces aligned at an angle of one hundred forty four degrees from each other, each planar surface configured to connect a first panel of the plurality of panels and a second panel of the plurality of panels at the angle of one hundred forty four degrees;
a first two panel connection surfaces aligned at an angle comprising one hundred twenty six degrees and configured to connect a third panel of the plurality of flat panels and a fourth panel of the plurality of panels at the angle comprising one hundred twenty six degrees with the first two panel connection surfaces;
a second two panel connection surfaces aligned at an angle comprising one hundred eight degrees and configured to connect a fifth panel of the plurality of flat panels and a sixth panel of the plurality of panels at the angle comprising one hundred eight degrees with the second two panel connection surfaces;
wherein a face surface of the first panel abuts next to a first of the two planar surfaces of an adjoining connector of the plurality of connectors and an edge surface of the first panel extends past the adjoining connector and overhangs the second panel abutting a second of the two planar surfaces of the adjoining connector;
wherein the planar surfaces and the panel connection surfaces are configured to align the panels according to any of a set of angles required to construct the partial rhombic triacontahedron enclosure.

18. The polyhedron structure of claim 1, wherein the two panel connection surfaces are distinct from the two planar surfaces.

19. The polyhedron structure of claim 1, wherein one of the two planar surfaces comprises one of the panel connection surfaces.

20. The polyhedron structure of claim 1, the panel connector further comprising a first set of panel connection surfaces aligned at the angle of one hundred twenty six degrees and a second set of panel connection surfaces aligned at the angle one hundred eight degrees.

* * * * *